Figure 1:
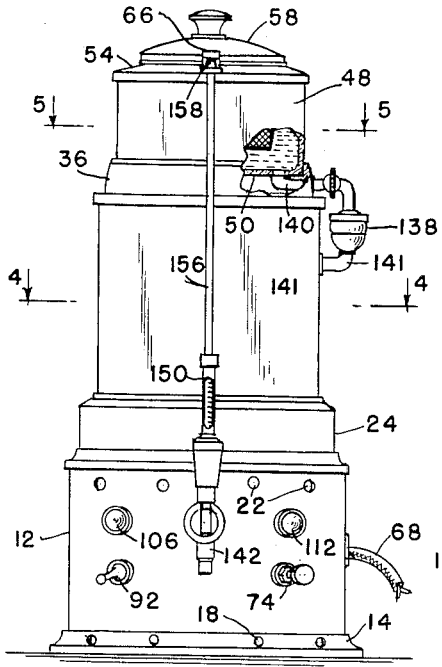

May 15, 1956 J. C. SCHWALL 2,745,334
COFFEE MAKING MACHINE
Filed March 11, 1952 2 Sheets-Sheet 1

INVENTOR
JULIUS C. SCHWALL,
BY
Irving Seidman
ATTORNEY

May 15, 1956 J. C. SCHWALL 2,745,334
COFFEE MAKING MACHINE
Filed March 11, 1952 2 Sheets—Sheet 2
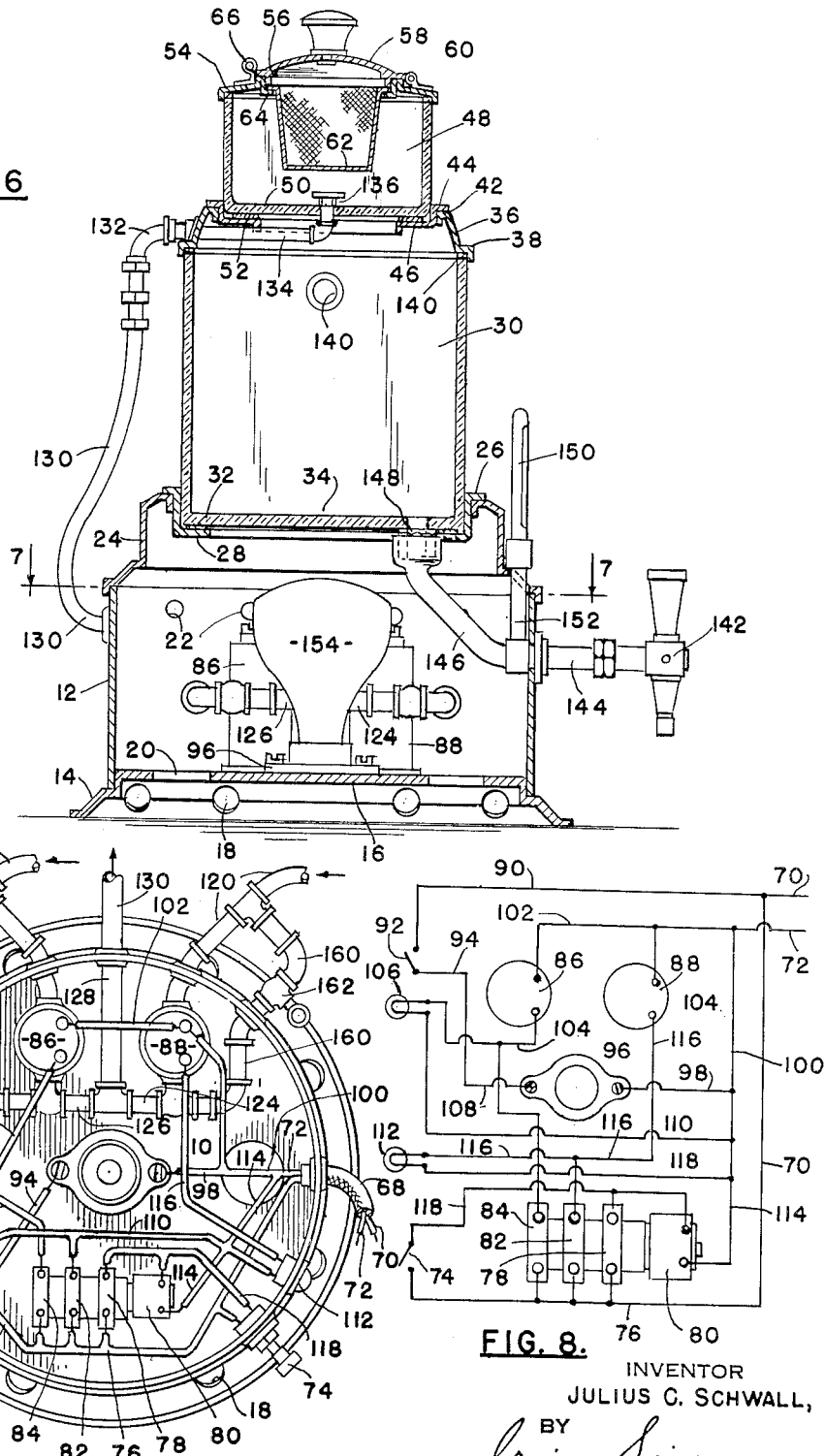
INVENTOR
JULIUS C. SCHWALL,
BY
Irving Seidman
ATTORNEY United States Patent Office 2,745,334
Patented May 15, 1956

2,745,334

COFFEE MAKING MACHINE

Julius C. Schwall, Brooklyn, N. Y., assignor to Wallin Industrial Corporation, New York, N. Y., a corporation Application March 11, 1952, Serial No. 275,899

1 Claim. (Cl. 99—283)

This invention relates to coffee brewing machines and has particular reference to a machine of said character wherein the operation of the machine is started by manually operated normally open push button switch and then continues, automatically, until the complete cycle and a given amount of coffee is brewed.

An object of this invention considers the provision of a coffee machine which will quickly brew a determined quantity of ground coffee, held in a basket within a brewing chamber, then passing the brewed coffee through a filter and into a storage chamber from whence the brewed coffee may be withdrawn. The said storage chamber resting upon a lower base compartment which contains various electrically connected units for controlling the water and steam flow from any suitable, conventional source (not shown in the drawings).

A further object of this invention is the provision therein of means within the lower base compartment for maintaining the brewed coffee within the storage compartment or reservoir at a constant or fixed temperature and including a visible temperature reading unit.

A still further object of this invention is the inclusion therein, of means for by-passing the hot water and steam supply lines to the brewing chamber when the electrical current fails.

A still further object of this invention is the provision of an organization in which the constituent elements are so arranged functionally and structurally as to assure improved results with materials and members which may be manufactured at reasonable cost, may be easily assembled and which will be efficient in operation with minimum wear to the parts.

The present invention consists essentially of a coffee brewing machine which comprises triple sections, set one above the other and which may readily be removed and parts disassembled for cleansing purposes. The said sections involve a base compartment which provides a housing for a series of controlling units, an intermediate transparent compartment for the storage of brewed coffee and resting upon the upper rim of the said base compartment, an upper compartment for brewing coffee and in turn resting upon the upper end of the said intermediate transparent compartment. The said upper coffee brewing compartment has a hinged cover and a basket or cage depending from the said cover into the said upper coffee brewing compartment and adapted to contain ground coffee, and a pipe line conveying hot water and steam to the upper coffee brewing compartment. The lower or base compartment comprises a housing in which there are located solenoid valves, electrically connected to a timing unit to control a hot water and steam flow to the said upper coffee brewing compartment.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claim.

Figure 2:
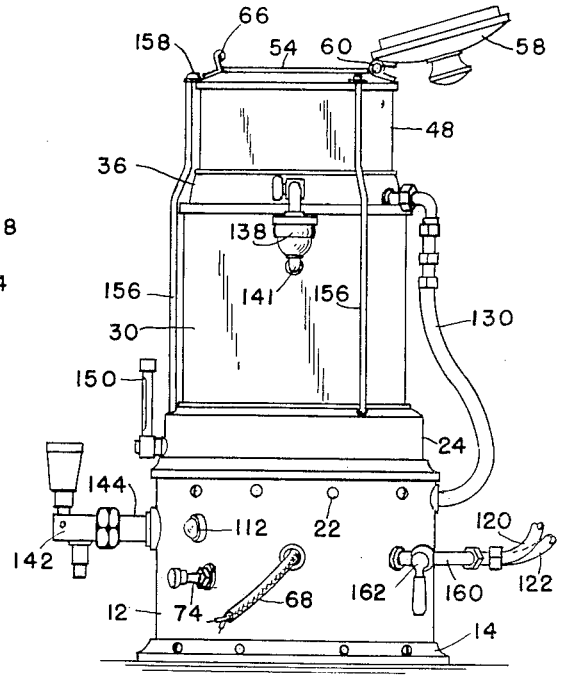
Figure 3:
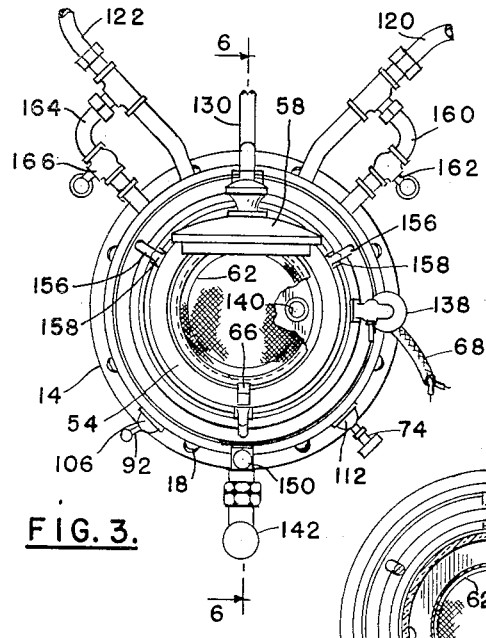
Figure 4:
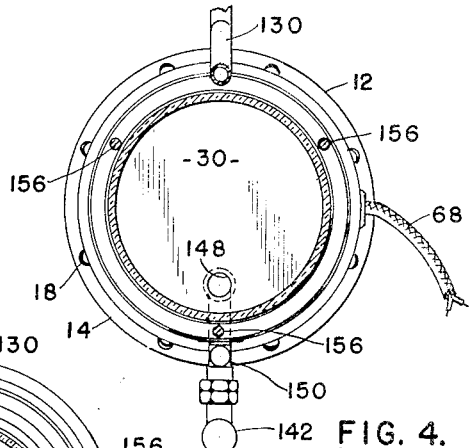
Figure 5:
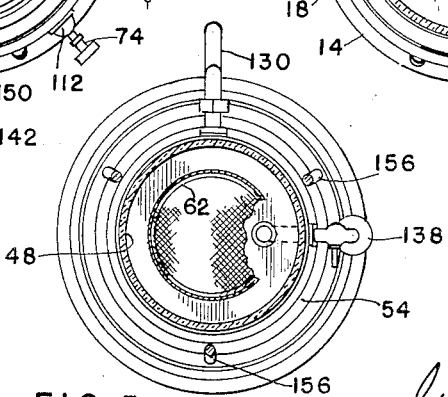

The invention itself, however, both as to its organization and its method of operation, will best be understood from the following description of a specific embodiment when read in connection with the accompanying drawings, in which:

Fig. 1 is a front elevational view of the apparatus.
Fig. 2 is a side view of same.
Fig. 3 is a top view showing the cover or hinged top-lid open and a portion of a ground coffee basket partly broken away.
Fig. 4 is a sectional plan view taken along line 4—4 of Fig. 1.
Fig. 5 is a sectional plan view taken along line 5—5 of Fig. 1.
Fig. 6 is an enlarged sectional elevation taken along line 6—6 of Fig. 3.
Fig. 7 is a plan view of the open base section with the parts above line 7—7 of Fig. 6 removed, and
Fig. 8 is a diagrammatic view of the electrical hookup.

Referring in detail to the parts in which like reference numerals refer to similar parts throughout, 12 designates a housing or base compartment which is mounted upon an annular shoe or foot member 14 formed with a base plate 16. The said foot member 14 is provided with a plurality of orifices or air inlets 18, the base plate 16 with air passage orifices 20 and the upper wall of the base compartment with air outlet orifices 22. Engageable over the upper edge of the base compartment wall is a lower annular separating and supporting member 24 and nesting within the said lower supporting member 24 there is an annular ring formed with an outwardly extending upper flange 26 (Fig. 6) which rests upon the upper edge of supporting member 24 and has a lower inwardly extending ledge 28.

An open top jar 30 is seated upon the ledge 28 and has a gasket 32 disposed between it and the bottom 34 of the jar 30. The said jar 30 forms a reservoir for brewed coffee. Engaging over the open top of the jar 30 is an upper annular connecting and supporting member 36 formed with a lower outwardly extending flange 38 which engages over the open top of the jar 30 and has a gasket 40 disposed therebetween. An inwardly extending flange 42 is formed upon the top of the said supporting member 36 upon which there rests a flanged ring 44 having a supporting ledge 46. Nesting within and upon the flange 46 upon the ring 44 there is an upper or second smaller jar 48 having a bottom 50. The said jar 30 and the jar 48 are both preferably made of heat resisting glass.

Disposed between the bottom 50 and the flange 46 there is a gasket 52. A cover 54 rests upon the upper edge of the upper jar 48 and has a central opening 56 with a lid 58 hinged to the said cover 54 at 60. A basket 62 preferably of fine wire mesh, is formed with a flanged upper edge which rests upon a flange 64 formed in the opening 56 and is adapted to contain ground coffee. A spring clip 66 is formed upon the cover 54 and is adapted to engage the edge of the lid 58 when same is in closed position.

Referring now to the base compartment 12 (see Figs. 7 and 8) an electrical conductor cable 68 leads from the current source (not shown) into the base compartment 12 and comprises the conductor wires 70 and 72. The line 70 leads to a spring actuated normally open switch 74 and thence along branch line 76 to a time switch 78 which controls the operation of the motor 80, then to the time switches 82 and 84, which, with the two solenoids 86 and 88 control the action of the water and steam valves respectively as will be hereinafter fully explained. From the line 76 a branch line 90 connects with a toggle switch 92 from whence a line 94 connects with one terminal of a lamp socket 96. The opposite terminal of the lamp socket 96 connects by the branch lines 98 and 100, with the water valve solenoid 88. A branch line 102 connects the water valve solenoid 88 with the steam valve solenoid 86. From the solenoid 86 a branch line 104 leads to and is connected to a pilot light 106. A branch line 109 leads from the line 104 to the timer 84. From the pilot light 106 a branch line 110 leads to the timer 82 and to the pilot light 112. A branch line 114 leads from the conductor line 72 through line 109 to the motor 80 and is also connected to the line 110. From the pilot light 112 a line 116 leads to the water valve solenoid 88. A branch line 118 leads from the push button switch 74 to the motor 80 and motor timer 78.

Hot water is fed to the solenoid operated water valve 88 through a pipe line 120 and steam is fed to the solenoid operated steam valve 86 through a pipe line 122. The outlet pipes 124 and 126 lead from the water valve in solenoid 88 and from the steam valve in solenoid 86 respectively to a feed pipe 128 thence to a flexible pipe 130 which extends upwardly to an elbow 132 and into the upper ring 36, through the pipe 134 (Fig. 6), then through the bottom 50 of the jar 48 and terminates in a spreader outlet 136 from where the water and steam is fed into the brewing jar 48 (see Figs. 6 and 7). The generated steam circulating through the ground coffee in the basket 62 is thus quickly brewed.

The generated steam in the jar 48 will circulate through the ground coffee in the basket 62 and brew the liquid coffee.

A filter 138 of any conventional and suitable type connects, by means of a pipe 140 (Fig. 1), through the bottom 50 of the brewing jar 48, and extends through the upper ring 36 to the filter 138 and then through the elbow 141 into the storage jar or reservoir 30 (Fig. 1). A draw-off top 142 is connected, by means of a pipe line 144—146, to a nipple 148 in the bottom 34 of the storage jar or reservoir 30 and a thermometer 150 is connected into the pipe 146 by means of the connection pipe 152. A suitable lamp, preferably an infra-red lamp 154 is secured in the socket 96 and provides a means for keeping the brewed coffee in the storage jar 30 at a desired temperature.

The two jars, namely the storage jar 30 and the brewing jar 48 with its cover 54 are held firmly together by vertical rods 156 which engage at their lower ends with the supporting ring 24 and are formed with a lip 158 at their upper ends which snap tightly over the cover 54.

In the event of electric power failure, means are provided to manually direct the operation of the machine. This means comprises in the case of the hot water feed line 120, a by-pass pipe line 160 which by-passes the solenoid valve 88 and connects with the line 124 to direct the hot water flow into the line 128 and flexible tube 130. A shut-off valve 162 is provided in the by-pass line 160. Similarly, a by-pass line 164, having a shut-off valve 166, is provided for the steam feed line 122 and feeds to the line 128 and flexible tube 130.

To operate the machine the spring push button switch 74 is pushed inwardly and held thus a short interval or until the motor 80 starts and pilot light 112 is illuminated. The push button switch is then released. At the same time that the motor starts the time switch 78 begins its rotation and the hot water starts its flow through the pipeline 120 and through the solenoid operated water valve 88 thereby allowing water to enter the brewing chamber 48. Contact is then made in time switch 84 to open the solenoid operated steam valve 86 allowing steam to enter the water intake and manifold 126 and 128 to keep the water at a proper or predetermined temperature and to agitate the water in the brewing chamber 48 thereby facilitating the brewing process. The steam automatically shuts off when the cycle is completed. The coffee is then brewed to completion and ready for clarifying through the filter 140 after which it enters the reservoir 30 from which it may be drawn through the top 142.

The heater lamp 154 is controlled by the toggle switch 92 and the temperature of the brewed coffee may be noted upon the thermometer 150. The hot water is maintained at 212° Fahrenheit as it flows from its source. The brewing process takes from one to two minutes. The temperature of the coffee at the draw-off top is fixed at 160° F.

I claim:

The combination in a coffee machine comprising a base, an intermediate and an upper compartment sections stacked one upon another, tie-rods connecting the said intermediate and upper sections, the said base section, having an open top and providing a housing for a series of electrical control units, a solenoid controlled hot water valve in said housing and having a pipe line supplying hot water to said solenoid controlled valve, a solenoid controlled steam valve having a pipe line supplying steam to the said solenoid controlled valve, a riser pipe line leading from the two said solenoid controlled valves to the said upper compartment section and adapted to direct hot water and steam to the said upper compartment, the said electrical control units in the said base compartment consisting of a triple disk timer unit, electrically connected to the electrical source, a motor to rotate the triple timer disks, and electrically connected with the third timer disk, the said third timer disk adapted to control the rotative action of the said motor, a manually operated push button switch electrically connected to the said motor and to said third timer disk and adapted to start and maintain the operation of the said motor, the said first and second timer disks of said triple disk timer unit having electrical connection with the said solenoid controlled steam and hot water valves, pilot lights in circuit with the said solenoid controlled valves to indicate the hot water and steam flow, an infra-red heating unit electrically connected to the current source, and a switch to control the current to the said heating unit, the said intermediate compartment adapted to rest over the open top of the said base compartment to provide a reservoir for the brewed coffee, a draw off tap connected to the bottom of the said intermediate compartment, the said upper compartment providing a coffee brewing chamber and resting upon the upper open end of the said intermediate compartment, a perforated basket in the said upper compartment adapted to contain ground coffee, a spreader outlet upon the upper end of the aforesaid riser pipe line adapted to spray the hot water and steam through the ground coffee in said basket and a pipe line connecting the said upper compartment with the said intermediate compartment.

References Cited in the file of this patent

UNITED STATES PATENTS

| | | |
|---|---|---|
| Re. 22,879 | Peters et al. | May 13, 1947 |
| 833,589 | Deane | Oct. 16, 1906 |
| 1,030,752 | Sharman | June 25, 1912 |
| 1,678,543 | Watson | July 24, 1928 |
| 2,014,325 | Grilli | Sept. 10, 1935 |
| 2,099,849 | Felix | Oct. 26, 1937 |
| 2,296,607 | Gair | Sept. 22, 1942 |
| 2,565,235 | Johnson | Aug. 21, 1951 |
| 2,570,148 | Newroth et al. | Oct. 2, 1951 |

FOREIGN PATENTS

| | | |
|---|---|---|
| 28,258 | France | Oct. 28, 1924 |
| 169,394 | Great Britain | Sept. 29, 1921 |
| 751,665 | France | June 26, 1933 |